US006540923B2

(12) United States Patent
Koizumi et al.

(10) Patent No.: US 6,540,923 B2
(45) Date of Patent: Apr. 1, 2003

(54) OXYGEN SCAVENGER

(75) Inventors: Masakazu Koizumi, Tokyo (JP); Yukimasa Shimura, Tokyo (JP); Shiro Taya, Tokyo (JP); Takatoshi Sato, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 14 days.

(21) Appl. No.: 09/729,204

(22) Filed: Dec. 5, 2000

(65) Prior Publication Data

US 2002/0100896 A1 Aug. 1, 2002

(51) Int. Cl.⁷ .............................. C02F 1/70; C23F 11/10
(52) U.S. Cl. ...................... 210/750; 210/757; 252/178; 252/188.28; 252/392
(58) Field of Search ...................... 252/188.28, 178, 252/392; 210/750, 757

(56) References Cited

U.S. PATENT DOCUMENTS

| 4,289,645 A | * | 9/1981 | Muccitelli ............ 252/188.28 X |
| 4,452,758 A | * | 6/1984 | Wilson et al. ............ 252/392 X |
| 4,626,411 A | * | 12/1986 | Nemes et al. ......... 252/188.28 X |
| 4,895,703 A | * | 1/1990 | Zupanovich et al. .. 252/188.28 X |
| 4,929,364 A | * | 5/1990 | Reardon et al. ...... 252/188.28 X |
| 5,256,311 A | * | 10/1993 | Rossi et al. ......... 252/188.28 X |
| 5,556,451 A | * | 9/1996 | Minevski ................ 252/392 X |
| 5,989,440 A | * | 11/1999 | Shimura et al. ....... 252/188.28 X |
| 6,059,992 A | * | 5/2000 | Veldman et al. ....... 252/188.28 |

FOREIGN PATENT DOCUMENTS

| JP | 57-204288 | * | 12/1982 | ............ 252/188.28 |
| JP | 10-158872 | | 6/1998 | |
| JP | 10-323561 | | 12/1998 | |

* cited by examiner

*Primary Examiner*—Richard D. Lovering
(74) *Attorney, Agent, or Firm*—Kanesaka & Takeuchi

(57) ABSTRACT

An oxygen scavenger, containing a heterocyclic compound having a N-substituted amino group as an effective component, can adequately exhibit the oxygen scavenging effect in not only feed water lines for high temperature water, a boiler, and steam and condensate return lines, but also feed water lines for low temperature water. The oxygen scavenger contains: a heterocyclic compound having a N-substituted amino group or a salt thereof; a hydroxybenzene derivative and/or a naphthoquinone derivative; and neutral amine.

6 Claims, 1 Drawing Sheet

OXYGEN SCAVENGER

FIELD OF THE INVENTION RELATED ART STATEMENT

The present invention relates to an oxygen scavenger, and more particularly to an oxygen scavenger which can effectively remove dissolved oxygen in water and, in particular, is useful in inhibiting the corrosion in a boiler system by removing dissolved oxygen in feed water.

Dissolved oxygen in feed water is a factor causing corrosion in a boiler system including a boiler, a heat exchanger and an economizer arranged upstream of the boiler, and a steam and condensate return line arranged downstream of the boiler. To inhibit the corrosion in the boiler system, dissolved oxygen in feed water should be removed by deoxidizing treatment of the feed water of the boiler.

Conventionally, chemical treatment or physical treatment has been applied for the removal of dissolved oxygen. As for the chemical treatment, a method of adding an oxygen scavenger, such as hydrazine ($N_2H_4$), sodium sulfite ($Na_2SO_3$), or hydroxylamine, into the feed water has been widely employed. However, hydrazine may be harmful to human health.

Since a reaction between sodium sulfite and oxygen is too rapid, sodium sulfite dissolved in water and stored in a tank reacts with oxygen in air before it is added in feed water, thereby reducing the concentration of effective component thereof. Therefore, there is a problem that sodium sulfite sometimes does not produce sufficient effect of dissolved oxygen removal. Since the feed water treated with sodium sulfite contains sulphate ion as a reaction product of the sodium sulfite and oxygen, there is a problem that the sulphate ion becomes another factor causing the corrosion and scale in a boiler system.

There is also a problem that hydroxylamine generates acid such as nitric acid when the hydroxylamine is added in feed water and reacts with oxygen in the boiler, thereby reducing corrosion inhibition effect for the boiler.

As an oxygen scavenger other than the above, a heterocyclic compound with N-substituted amino group such as 1-aminopyrrolidine and 1-amino-4-methylpiperazine has been proposed (Japanese patent H10-158872A). The heterocyclic compound with N-substituted amino group exhibits excellent oxygen scavenging effect by reacting with dissolved oxygen in feed water, thereby exhibiting excellent effect of inhibiting the corrosion in a boiler system.

However, the heterocyclic compound with N-substituted amino group is not entirely satisfactory as an oxygen scavenger under all conditions because at relatively low water temperatures, e.g. 80° C. or lower, its reaction with dissolved oxygen is rather slow so that the oxygen scavenging effect may be insufficient.

The use of a hydroxybenzene derivative together with the heterocyclic compound with N-substituted amino group speeds up the reaction with dissolved oxygen, thus improving the corrosion inhibition effect at relatively low water temperatures (Japanese patent H10-323561A). However, since most of hydroxybenzene derivatives are not water soluble and even water soluble hydroxybenzene derivative has low solubility, it is impossible to dissolve the hydroxybenzene derivative sufficiently for exhibiting effect.

OBJECT AND SUMMARY OF THE INVENTION

It is the object of the present invention to solve the aforementioned problems and to provide an oxygen scavenger which contains heterocyclic compound with N-substituted amino group as an effective component and can adequately exhibit the oxygen scavenging effect in not only feed water lines for high temperature water, a boiler, and steam and condensate return lines, but also feed water lines for low temperature water.

An oxygen scavenger of the present invention contains a heterocyclic compound with N-substituted amino group and/or a salt thereof; one or more aromatic compound selected from a group consisting of hydroxybenzene derivatives and naphthoquinone derivatives; and neutral amine.

In the oxygen scavenger of the present invention, the heterocyclic compound with N-substituted amino group or the salt thereof can exhibit excellent oxygen scavenging effect even in feed water lines containing low temperature water because of a catalytic function of the hydroxybenzene derivative and/or the naphthoquinone derivative which can coexist under the presence of the neutral amine. By adding the neutral amine, such chemical of one-pack type that can provide well effect for inhibiting corrosion of all of pipes in a feed water system, a boiler, and steam and condensate return lines can be provided.

In the present invention, examples of the hydroxybenzene derivatives are represented by the following formulas i and ii, and examples of naphthoquinone derivatives are represented by the following formulas iii and iv:

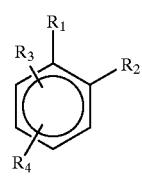

i

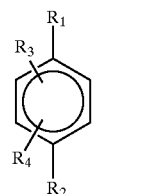

ii

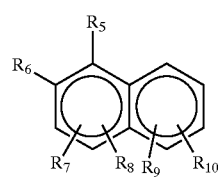

iii

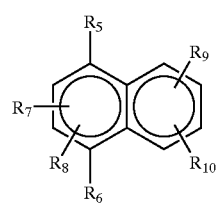

iv where R1 is —OH,

R2 is —OH or —$NH_2$,

R3 and R4 each designate —OH, —$NH_2$ lower alkyl group having 1–8 carbon atoms, carboxyl group, or lower alkoxy carbonyl group, R5 and R6 are each —OH or =O, and R7, R8, R9, and R10 each designate —OH, —$NH_2$ lower alkyl group having 1–8 carbon atoms.

DETAILED DESCRIPTION OF THE PREFERRED EMBODIMENTS

Figure 1:
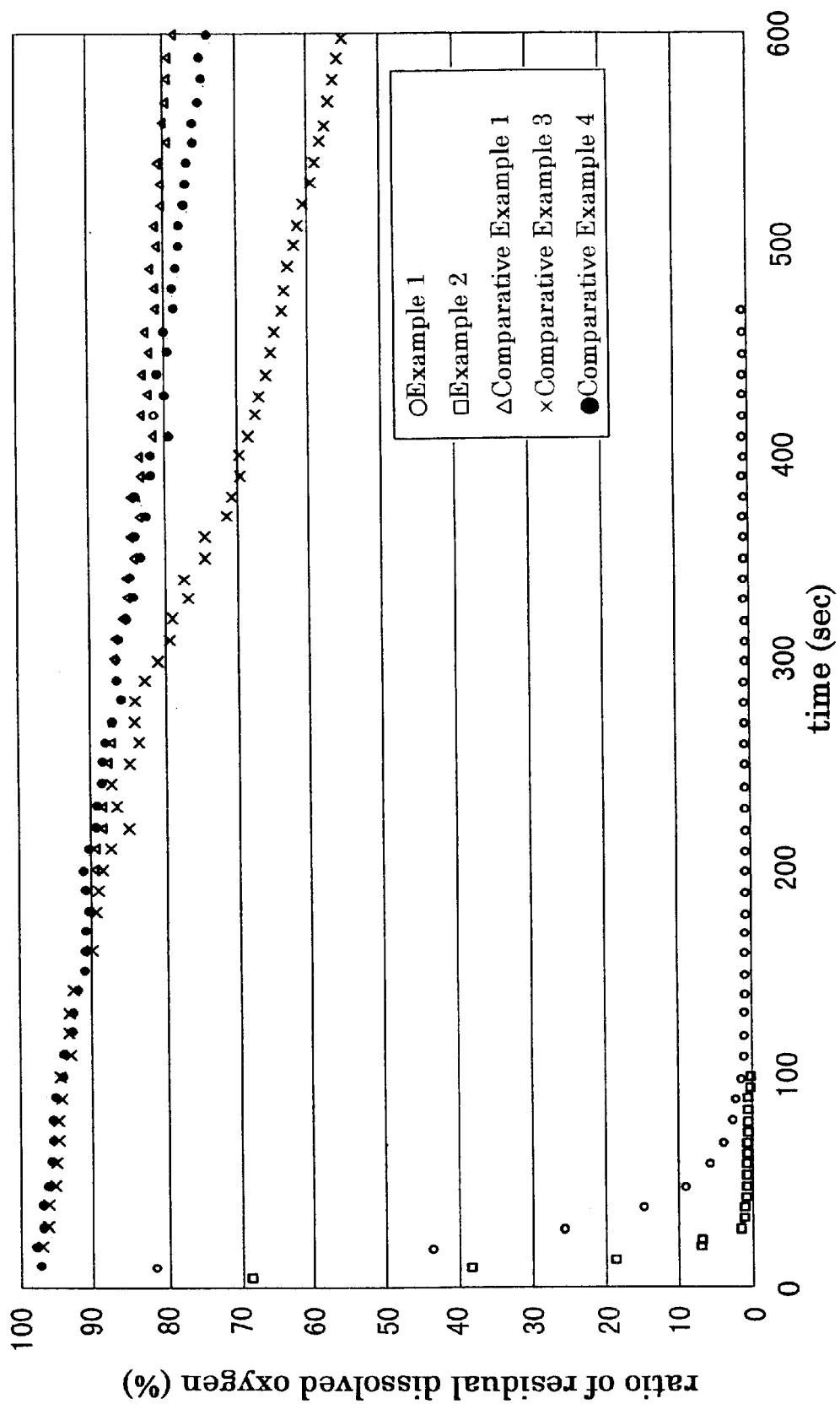
FIG. 1 is a graph showing results of measurement of Examples.

The heterocyclic compound with N-substituted amino group employed in the present invention is preferably at least one of 1-aminopyrrolidine, 1-amino-4-methylpiperazine, 1-aminopiperidine, 1-aminohomopiperidine, 1,4-diaminopiperazine, N-aminomorpholine, and morpholinobiguanide. As the salt thereof, water soluble salt of the aforementioned heterocyclic compounds and carboxylic acid such as succinic acid or gluconic acid, and/or polycarboxylic acid such as polyacrylic acid may be employed. However, other compounds may be employed. Each of these heterocyclic compounds and the salts thereof may be suitably used alone or in combination with one or more of the others.

Examples of hydroxybenzene derivative employed in the present invention are hydroquinone, 2,3-dimethyl-1,4-hydroquinone, 2-tert-butylhydroquinone, catechol, 4-tert-butyl catechol, pyrogallol, 1,2,4-hydroxybenzene, gallic acid, methyl gallate, ethyl gallate, propyl gallate, 2-aminophenol, and 2,4-diaminophenol, but the hydroxybenzene derivative is not limited to these.

Examples of naphthoquinone derivative employed in the present invention are 1,4-naphthoquinone, 1,2-naphthoquinone, 1,4-naphthohydroquinone, 1,2-naphthohydroquinone, 2,6-naphthoquinone, naphthopurpurine, 5, 8-dihydro-1, 4-naphthoquinone, 5,6,7, 8-tetrahydro-1,4-naphthoquinone, 3,4-dihydroxy-1,4-naphthoquinone, 4-amino-1,2-naphthoquinone, and 2-amino-1,4-naphthoquinone, but the naphthoquinone derivative is not limited to these.

Each of the hydroxybenzene derivatives and the naphthoquinone derivatives may also be suitably used alone or in combination with one or more of the others.

As the neutral amine employed in the present invention, cyclohexylamine, 2-amino-2-methyl-1-propanol, monoethanolamine, diethanolamine, morpholine, monoisopropanolamine, diethylethanolamine, diethylpropanolamine, dimethylethanolamine, and dimethylpropylamine may be preferably employed, but the neutral amine is not limited to these. Each of these may be suitably used alone or in combination with one or more of the others.

Though the oxygen scavenger of the present invention can be prepared by mixing the aforementioned heterocyclic compound having the N-substituted amino group or the salt thereof, one or more of the hydroxybenzene derivatives and/or the naphthoquinone derivatives (hereinafter, sometimes called as "catalytic compound"), and the neutral amine, these may be separately added to feed water.

The amount of the oxygen scavenger of the present invention can be altered to suitably correspond to the concentration of dissolved oxygen and other water conditions in feed water of a boiler system as a subject. Normally, the heterocyclic compound having the N-substituted amino group or the salt thereof is added by an amount from 0.001 to 1000 mg, preferably from 0.01 to 200 mg, the catalytic compound is added by an amount from 0.0001 to 100 mg, preferably from 0.001 to 20 mg, and the neutral amine is added by an amount from 0.01 to 1000 mg, preferably from 0.1 to 200 mg, relative to 1 lit. of feed water.

The ratio of the heterocyclic compound having the N-substituted amino group or the salt thereof and the catalytic compound and the neutral amine in the oxygen scavenger of the present invention is preferably set to Heterocyclic compound with N-substituted amino group or Salt thereof: Catalytic compound=1:0.001–1 (ratio in weight), and Catalytic compound: Neutral amine=1:1–1000 (ratio in weight). When the catalytic compound is less than the ratio, the effect improved by using the catalytic compound according to the present invention, i.e. the improved effect of the oxygen scavenging in low temperature water can not be sufficiently obtained. On the other hand, when the catalytic compound is more than the ratio, the increase in the cost is large as compared to the increase in the effect. When the neutral amine is less than the ratio, the stability to solubility improved by using the neutral amine can not be sufficiently obtained. When the neutral amine is more than the ratio, the effect of inhibiting the corrosion of copper pipes in a steam line and a condensate return line is decreased.

Besides the heterocyclic compound having the N-substituted amino group or the salt thereof, the catalytic compound and the neutral amine, the oxygen scavenger of the present invention may contain alkaline chemicals such as sodium phosphate, sodium hydroxide, or potassium hydroxide, dispersant of water-soluble polymer or the like, another corrosion inhibitor such as succinic acid or gluconic acid, and/or chelate compound, descaling chemicals, or a mixture of some of these.

The oxygen scavenger of the present invention can be effectively used in boiler systems of various types such as low pressure, medium pressure, and high pressure boiler systems and is not restricted at all by the boiler pressure, the boiler type, or the kind of feed water.

Hereinafter, the present invention will now be described in detail with reference to examples and comparative examples.

EXAMPLES 1 THROUGH 3, COMPARATIVE EXAMPLES 1 THROUGH 5

Chemicals made of compounds shown in Table 1 were prepared. Then, the solubility and the preservation stability of the respective chemicals were measured(the preservation stability was measured by visual observation after preserved for a time period shown in Table 1 and at a temperature shown in Table 1) and the results are shown in Table 1.

TABLE 1

| | Components (wt %) | | | | | Evaluation results *4 | | | | | | |
| | heterocylic compound having N-substituted amino group *1 | Catalytic coumpound *2 kind | Catalytic coumpound *2 amount | Neutral amine *3 | water | Solubility | Preservation stability | | | | | |
| | | | | | | | 40° C. one week | 40° C. one month | −5° C. one week | −5° C. one month | Room temperature one week | Room temperature one month |
|---|---|---|---|---|---|---|---|---|---|---|---|---|
| Example | | | | | | | | | | | | |
| 1 | 25 | A | 2.5 | 47.5 | 25 | ○ | ○ | ○ | ○ | ○ | ○ | ○ |
| 2 | 25 | B | 0.5 | 47.5 | 27 | ○ | ○ | ○ | ○ | ○ | ○ | ○ |
| Comparative example | | | | | | | | | | | | |
| 1 | 25 | — | 0 | 0 | 75 | ○ | ○ | ○ | ○ | ○ | ○ | ○ |
| 2 | 25 | A | 2.5 | 0 | 72.5 | X | X | X | X | X | X | X |
| 3 | 25 | A | 0.2 | 0 | 74.8 | ○ | ○ | X | ○ | ○ | ○ | X |
| 4 | 25 | — | 0 | 47.5 | 27.5 | ○ | ○ | ○ | ○ | ○ | ○ | ○ |
| 5 | 25 | B | 0.5 | 0 | 74.5 | X | X | X | X | X | X | X |

*1 60 weight % 1-aminopyrrolidine
*2 Catalytic Compound A 4-tert-butyl catechol
Catalytic Compound B 1,4-naphthoquinone
*3 monoethanolamine
*4 ○ without precipitation
X with precipitation The followings are apparent from Table 1. That is, Comparative Example 1 containing only 1-aminopyrrolidine as a heterocyclic compound with the N-substituted amino group and Comparative Example 4 containing monoethanolamine as the neutral amine as well as 1-aminopyrrolidine have good solubility and preservation stability. As for Comparative Examples 2, 3 containing 4-tert-butyl catechol as the catalytic compound as well as 1-aminopyrrolidine, however, the catalytic compound of Comparative Example 2 was not dissolved because the amount of the catalytic compound was large. On the other hand, the catalytic compound of Comparative Example 3 was dissolved because the amount of the catalytic compound was small. However, the catalytic compound of Comparative Example 3 precipitated when preserved for a long period of time. From the results, it is found that the amount of catalytic compound in Comparative Example 3 is the upper limit. In Comparative Example 5 containing 1,4-naphthoquinone as the catalytic compound as well as 1-aminopyrrolidine, the catalytic compound was not dissolved. Compared to the above, Examples 1, 2 containing the catalytic compound and the neutral amine as well as 1-aminopyrrolidine are excellent in the solubility and the preservation stability.

From Examples 1, 2 and Comparative Examples 1 through 5, Examples 1, 2 and Comparative Examples 1, 3, 4 in which the chemicals were dissolved were measured for the oxygen scavenging rate according to the following method. The results are shown in FIG. 1.

500 ml of purified water was filled into an Erlenmeyer flask and was stirred for two hours in a constant-temperature water bath at 40° C. in such a manner as to be saturated by oxygen in air. The concentration of dissolved oxygen at this point was measured by a dissolved oxygen meter ("MOCA3600" manufactured by Orbisphere Laboratories Japan Inc.) with the result that it was 6.5 mg/L.

Then, after adding chemicals by 0.5 g into the water in the Erlenmeyer flask, respectively, and sufficiently stirring them, the pH was adjusted to be 11.0–11.1 by using NaOH. The resultant solution was poured into incubation bottles of 200 ml capacity and the incubation bottles were capped without space therein and then returned into the constant-temperature water bath at 40° C. to cause the reaction of the solution. The incubation bottles were taken out from the constant-temperature water bath one at a time with the passage of predetermined periods and the concentrations of dissolved oxygen in the solution were measured by the dissolved oxygen meter. The residual rate of dissolved oxygen in each sample solution was calculated from the ratio of the concentration of dissolved oxygen after adding the chemicals to that before adding the chemicals. These operations were rapidly performed in nitrogen-atmosphere.

As apparent from the results of FIG. 1, it is found that any one of the oxygen scavengers which uses the catalytic compound and monoethanolamine as the neutral amine with 1-aminopyrrolidine as the heterocyclic compound having the N-substituted amino group has significantly speeded-up oxygen scavenging reaction.

COMPARATIVE EXAMPLE 6

A reaction vessel made of SUS having a volume of one liter was immersed in a constant temperature water bath of 60° C. Pure water which was saturated with oxygen in air at 60° C. was fed to a bottom of the vessel at a rate of 100 ml/min, and the water was taken out from a top of the vessel at a rate of 100 ml/min for 45 hours. After 45 hours passed, concentration of dissolved oxygen in the effluent water was 4.5 mg/L which was measured by the dissolved oxygen meter. A test coupon of carbon steel having a size of 1×15×50 mm was held in the vessel during the above 45 hours.

The test coupon was taken out from the vessel after the above 45 hours elapsed, removed its corroded rust, and detected its corrosion loss. A result thereof is shown in Table2.

COMPARATIVE EXAMPLES 7–9

Same comparative examples as above were conducted except that a compound listed in Table 2 was added at an additive rate shown in Table 2. Results thereof are shown in Table 2.

EXAMPLES 3–24

Same examples as the above comparative example 6 were conducted except that a compounds listed in Table 2 was added at an additive rate shown in Table 2. Results thereof are shown in Table 2.

TABLE 2

| | heterocylic compound having N-substituted amino group | | catalytic compound | | neutral amine | | concentration of dissolved oxygen in efflunet from reaction vessel (mg/L) | amount of corrosion of test coupon in reaction vessel (mg) |
|---|---|---|---|---|---|---|---|---|
| | kind | amount (mg/L) | kind | amount (mg/L) | kind | amount (mg/L) | | |
| Comparative Example | | | | | | | | |
| 6 | — | — | — | — | — | — | 4.5 | 10.4 |
| 7 | 1-aminopyrrolidine | 20 | — | — | — | — | 3.8 | 8.7 |
| 8 | 1-aminopyrrolidine | 20 | 4-tert-butylcatechol | 2 | — | — | 0.4 | 2.3 |
| 9 | 1-aminopyrrolidine | 20 | — | — | monoethanolamine | 5 | 3.5 | 7.4 |
| Example | | | | | | | | |
| 3 | 1-aminopyrrolidine | 10 | 4-tert-butylcatechol | 1 | monoethanolamine | 3.5 | 1.0 | 1.9 |
| 4 | 1-aminopyrrolidine | 20 | 4-tert-butylcatechol | 2 | monoethanolamine | 3.5 | <0.1 | <1.0 |
| 5 | 1-aminopyrrolidine | 20 | 1,4-naphthoquinone | 2 | monoethanolamine | 3.5 | <0.1 | <1.0 |
| 6 | 1-aminopyrrolidine | 20 | hydroquinone | 2 | monoethanolamine | 3.5 | <0.1 | <1.0 |
| 7 | 1-aminopyrrolidine | 20 | propyl gallate | 2 | monoethanolamine | 3.5 | <0.1 | <1.0 |
| 8 | 1-aminopyrrolidine | 20 | 1,4-naphtohydroquinone | 2 | monoethanolamine | 3.5 | <0.1 | <1.0 |
| 9 | 1-aminopyrrolidine | 20 | 4-tert-butylcatechol | 2 | cyclohexylamine | 3.5 | <0.1 | <1.0 |
| 10 | 1-aminopyrrolidine | 20 | 4-tert-butylcatechol | 2 | monoisopropyl-hydroxylamine | 3.5 | <0.1 | <1.0 |
| 11 | 1-aminopyrrolidine | 20 | 4-tert-butylcatechol | 2 | diethylethanolamine | 3.5 | <0.1 | <1.0 |
| 12 | 1-aminopyrrolidine | 20 | hydroquinone | 2 | cyclohexylamine | 3.5 | <0.1 | <1.0 |
| 13 | 1-aminopyrrolidine | 20 | hydroquinone | 2 | monoisopropyl-hydroxylamine | 3.5 | <0.1 | <1.0 |
| 14 | 1-aminopyrrolidine | 20 | hydroquinone | 2 | diethylethanolamine | 3.5 | <0.1 | <1.0 |
| 15 | 1-amino-4-methylpiperazine | 25 | 4-tert-butylcatechol | 2 | monoethanolamine | 3.5 | <0.1 | <1.0 |
| 16 | 1-amino-4-methylpiperazine | 25 | 4-tert-butylcatechol | 2 | cyclohexylamine | 3.5 | <0.1 | <1.0 |
| 17 | 1-amino-4-methylpiperazine | 25 | hydroquinone | 2 | monoethanolamine | 3.5 | <0.1 | <1.0 |
| 18 | 1-amino-4-methylpiperazine | 25 | hydroquinone | 2 | cyclohexylamine | 3.5 | <0.1 | <1.0 |
| 19 | N-aminomorpholine | 22 | 4-tert-butylcatechol | 2 | monoethanolamine | 3.5 | <0.1 | <1.0 |
| 20 | N-aminomorpholine | 22 | hydroquinone | 2 | monoethanolamine | 3.5 | <0.1 | <1.0 |
| 21 | 1-aminopyrrolidine | 20 | 4-tert-butylcatechol | 2 | monoethanolamine cyclohexylamine | 1.8 1.8 | <0.1 | <1.0 |
| 22 | 1-aminopyrrolidine | 20 | 4-tert-butylcatechol | 2 | cyclohexylamine monoisopropyl-hydroxylamine | 1.8 1.8 | <0.1 | <1.0 |
| 23 | 1-aminopyrrolidine | 20 | 4-tert-butylcatechol 1,4-naphthoquinone | 1 1 | monoethanolamine | 3.5 | <0.1 | <1.0 |
| 24 | 1-aminopyrrolidine | 20 | 4-tert-butylcatechol propyl gallate | 1 1 | monoethanolamine | 3.5 | <0.1 | <1.0 |

As apparent from the above description, the oxygen scavenger of the present invention is of one-pack type, can be stably preserved for a long period of time, has improved oxygen scavenging capacity even in feed water lines for low temperature water, and thus can provide significantly improved effect for inhibiting corrosion of pipes in feed water lines.

What is claimed is:
1. An oxygen scavenger comprising:
   at least one of a heterocyclic compound having an N-substituted amino group and a salt thereof, said N-substituted amino group being composed of at least one material selected from the group consisting of 1-aminopyrrolidine, 1-amino-4-methylpiperazine, 1-aminopiperidine, 1-aminohomopiperidine, 1,4-diaminopiperazine, N-aminomorpholine and morpholinobyguanide, said salt thereof being a water soluble salt composed of the heterocyclic compound and an organic acid selected from the group consisting of carboxylic acids and polycarboxylic acids;
   at least one aromatic compound selected from the group consisting of hydroxybenzene derivatives and naphthoquinone derivatives as a catalytic compound, said hydroxybenzene derivative being at least one selected from the group consisting of 2,3-dimethyl-1,4-hydroquinone, 2-tert-butylhydroquinone, catechol, 4-tert-butyl catechol, pyrogallol, 1,2,4-hydroxybenzene, gallic acid, methyl gallate, ethyl gallate, propyl gallate, 2-aminophenol and 2,4-diaminophenol, and said naphthoquinone derivative being at least one selected from the group consisting of 1,4-naphthoquinone, 1,2-naphthoquinone, 1,4-naphthohydroquinone, 1,2-naphthohydroquinone, 2,6-naphthoquinone, naphthopurpurine, 5,8-dihydro-1,4-naphthoquinone, 5,6,7,8-tetrahydro-1,4-naphthoquinone, 3,4-dihydroxy-1,4-naphthoquinone, 4-amino-1,2-naphthoquinone and 2-amino-1,4-naphthoquinone and neutral amine containing at least one material selected from the group consisting of cyclohexylamine, 2-amino-2-methyl-1-propanol, monoethanolamine, diethanolamine, morpholine, monoisopropanolamine, diethylethanolamine, diethylpropanolamine, dimethylethanolamine, and dimethylpropylamine, wherein a ratio in weight of the heterocyclic compound having the N-substituted amino group including the salt thereof and the catalytic compound and the neutral amine is set to:

Heterocyclic compound having N-substituted amino group or Salt thereof: Catalytic compound 1:0.001–1, and Catalytic compound Neutral amine=1:1–1,000.

2. An oxygen scavenger as claimed in claim 1, wherein said at least one material of the heterocyclic compound is 1-aminopyrrolidine, said at least one aromatic compound is 4-tert-butyl catechol, and said neutral amine is monoethanolamine.

3. An oxygen scavenger as claimed in claim 1, wherein said at least one material of the heterocyclic compound is 1-aminopyrrolidine, said at least one aromatic compound is 1,4-naphthoquinone, and said neutral amine is monoethanolamine.

4. An oxygen scavenger as claimed in claimed 1 consisting essentially of said at least one material of said heterocyclic compound, said at least one aromatic compound, and said neutral amine.

5. A method of use of an oxygen scavenger, comprising: adding to boiler feed water an effective amount of the oxygen scavenger as claimed in claim 1.

6. A method of use of an oxygen scavenger as claimed in claim 5, wherein following amounts of components of the oxygen scavenger are added to boiler feed water per 1 liter:

Heterocyclic compound having N-substituted amino group or Salt thereof: from 0.001 to 1,000 mg, and Catalytic compound: from 0.0001 to 100 mg, Neutral amine: from 0.01 to 1,000 mg.

* * * * *